United States Patent [19]
Kee

[11] Patent Number: 5,540,055
[45] Date of Patent: Jul. 30, 1996

[54] SUCTION AND EXHAUST CONNECTION DEVICE

[76] Inventor: Kum Kee, Ga-2F., 76-6 Yokchon 2-Dong, Eunpyung-Ku, Seoul, Rep. of Korea

[21] Appl. No.: 377,767

[22] Filed: Jan. 24, 1995

[51] Int. Cl.⁶ ................................................ F02B 33/00
[52] U.S. Cl. ............................. 60/605.1; 123/58.7
[58] Field of Search ............................. 123/58.7, 184.21, 123/65 B, 58.8, 184.53; 60/605.1; 417/380

[56] References Cited

U.S. PATENT DOCUMENTS

| | | |
|---|---|---|
| 614,441 | 11/1898 | Burnett . |
| 1,045,197 | 11/1912 | Schuler . |
| 4,064,899 | 12/1977 | Lehmann . |
| 4,181,139 | 1/1980 | Martini . |
| 4,211,082 | 7/1980 | Bristol .................................... 60/605.1 |
| 4,219,017 | 8/1980 | Shamlian et al. . |
| 4,230,140 | 10/1980 | Hart . |
| 4,396,032 | 8/1983 | Duchesne et al. . |
| 4,527,582 | 7/1985 | Buckle et al. . |
| 4,924,904 | 5/1990 | Carter . |
| 5,097,860 | 3/1992 | Ferguson et al. . |
| 5,184,609 | 2/1993 | Hart . |

FOREIGN PATENT DOCUMENTS

| | | | |
|---|---|---|---|
| 0781987 | 5/1935 | France ................................... | 60/605.1 |
| 3137471 | 4/1983 | Germany ............................... | 60/605.1 |
| 3625053 | 2/1988 | Germany ............................... | 60/605.1 |
| 0014168 | 4/1971 | Japan ..................................... | 60/605.1 |
| 0638923 | 6/1950 | United Kingdom .................. | 60/605.1 |
| 0815494 | 6/1959 | United Kingdom .................. | 60/605.1 |

*Primary Examiner*—Marguerite McMahon
*Attorney, Agent, or Firm*—Ladas & Parry

[57] ABSTRACT

A suction and exhaust connection device for a multi-cylinder internal combustion engine is disclosed. The device converts the exhaust pressure of a cylinder in the exhaust stroke into suction pressure for another cylinder in the suction stroke which is synchronized with the exhaust stroke of the one cylinder performing the exhaust stroke, thereby increasing suction speed and amount. The device also temporarily keeps the suction gas therein just after the suction stroke of the cylinder performing the suction stroke and introduces the suction gas into the other cylinder during the next suction stroke, thus restricting suction interference. The device temporarily keeps a part of the exhaust gas therein during the exhaust stroke of the cylinder performing the exhaust stroke and expels the exhaust gas to the outside after a predetermined time, thus restricting exhaust interference and allowing continuous exhaust of the gas.

14 Claims, 3 Drawing Sheets

5,540,055

SUCTION AND EXHAUST CONNECTION DEVICE

BACKGROUND OF THE INVENTION

1. Field of the Invention

The present invention relates in general to a suction and exhaust connection device for multi-cylinder internal combustion engines and, more particularly, to a structural improvement in such a suction and exhaust connection device for converting the detonation exhaust pressure of a cylinder in an exhaust stroke into a suction pressure of another cylinder in a suction stroke synchronous with the exhaust stroke of one cylinder thereby increasing both the suction speed and amount, and for temporarily keeping the suction gas therein just after a suction stroke of the other cylinder and letting the suction gas be sucked into the other cylinder at a high speed in the next suction stroke of the other cylinder, thereby restricting the suction interference and increasing the suction amount, and for temporarily keeping a part of the exhaust gas therein during the exhaust stroke of the one cylinder and expelling the temporarily kept exhaust gas to the outside after a predetermined time, thereby restricting the exhaust interference and letting the continuous exhaust of the exhaust gas and reducing the exhaust noise of the engine.

2. Description of the Prior Art

In conventional multi-cylinder internal combustion engines for automobiles, suction and exhaust efficiency of the engine is an important factor largely affecting both engine output and rate of fuel consumption. In internal combustion engines, the suction stroke for drawing a fresh gas mixture or a suction gas into a cylinder is achieved by negative pressure formed in the cylinder due to a downward movement of a piston in the cylinder, while the exhaust stroke for expelling the detonation exhaust gas from the cylinder is achieved by positive pressure formed in the cylinder due to an upward movement of the piston in the cylinder and due to the remaining combustion pressure in the cylinder. Meanwhile, the remaining combustion pressure of the cylinder is considerably high, so that the exhaust gas, which is expelled from the cylinder into the exhaust port the moment the exhaust valve is opened, flows at a high pressure, a high temperature and at a high speed exceeding the speed of sound. However, the negative pressure formed in the cylinder due to the downward movement of the piston is just slightly higher than the positive pressure of the cylinder in the exhaust stroke and, furthermore, the suction resistance is increased when the suction gas passes through the air filter and through the suction line. Therefore, it is difficult to supply a sufficient amount of mixture gas for the cylinder.

In order to improve the engine efficiency of the internal combustion engine, the high temperature, high pressure exhaust gas should be rapidly expelled from the cylinder during the exhaust stroke to the outside and the fresh gas mixture should be sucked into the cylinder during the suction stroke.

Another problem of the typical suction and exhaust device of the internal combustion engine is that a part of the fresh gas mixture strikes against the suction valve and flows in a reverse direction when the suction valve is closed just after the suction stroke. The reverse flow of the fresh gas mixture interferes with the fresh gas mixture sucked into the cylinder in the next suction stroke and the interference of the fresh gas mixture reduces engine output. When the high temperature, high pressure exhaust gas, which is expelled from a cylinder through the exhaust port during the exhaust stroke of the cylinder, remains in the exhaust manifold or in the exhaust pipe, the exhaust gas remaining in the exhaust manifold or in the exhaust pipe interferes with the exhaust gas expelled from another cylinder. Such interference of the exhaust gas not only causes vibration and engine noise, but also deteriorates the exhaust efficiency of the engine.

SUMMARY OF THE INVENTION

In order to overcome the above problems, the inventors studied the suction and exhaust mechanism of a multi-cylinder internal combustion engine and have provided a suction and exhaust connection device which remarkably improves the suction and exhaust efficiency of the engine and restricts the suction interference as well as the exhaust interference of the engine, thus improving engine output as well as engine efficiency.

It is, therefore, an object of the present invention to provide a suction and exhaust connection device for a multi-cylinder internal combustion engine which converts the detonation exhaust pressure of a cylinder in the exhaust stroke into the suction pressure of another cylinder during the suction stroke synchronously using the exhaust stroke of the one cylinder, thus increasing both suction speed and amount.

It is another object of the present invention to provide a suction and exhaust connection device for a multi-cylinder internal combustion engine which temporarily keeps the suction gas therein just after the suction stroke of a cylinder and lets the temporarily kept suction gas be sucked into the cylinder at a high speed during the next suction stroke of the cylinder, thus restricting the suction interference as well as increasing the suction amount.

It is still another object of the present invention to provide a suction and exhaust connection device for a multi-cylinder internal combustion engine which temporarily keeps a part of the exhaust gas expelled from a cylinder at a high pressure in an exhaust stroke of the cylinder and expels the temporarily kept exhaust gas to the outside after a predetermined time, thus restricting the exhaust interference and allowing continuous exhaust of the gas and reducing the exhaust noise of the engine.

In order to accomplish the above object, the present invention provides a suction and exhaust connection device for a multi-cylinder internal combustion engine in which, the exhaust stroke of one of the engine cylinders which at least partially synchronized with the suction stroke of another cylinder, said device comprising: a pressure transmitting pipe connected at its opposite ends to an exhaust port of the one cylinder and to a suction port of the other cylinder respectively; and a booster pump provided in the center of the pressure transmitting pipe, which booster pump increases the speed of the suction gas in the suction port of the other cylinder by means of the exhaust pressure of the exhaust port of the one cylinder.

The booster pump comprises a booster cylinder connected at its opposite ends to the suction side and exhaust side of the pressure transmitting pipe respectively, and a pressure transmitting means placed in the booster cylinder, which means is biased toward the exhaust side of the pressure transmitting pipe by a predetermined restoring force.

In the above and following description, the term "suction side" means the side connected to the suction line of the engine, while the term "exhaust side" means the side connected to the exhaust line of the engine.

In the above suction and exhaust connection device for the multi-cylinder internal combustion engine of the present invention, the gas mixture remaining in the suction line of another cylinder which has just performed a suction stroke is introduced into the booster pump through the suction side of the pressure transmitting pipe. Thereafter, a part of the exhaust gas of the cylinder performing the exhaust stroke is introduced into the booster pump through the exhaust side of the pressure transmitting pipe at high speed during the next suction stroke of said other cylinder, thus forcibly pushing the pressure transmitting means of the booster pump so that the suction gas temporarily kept in the booster pump is expelled to the suction port at high speed. When the exhaust valve of the cylinder performing the exhaust stroke is closed after the exhaust stroke of the cylinder, the exhaust line pressure of this cylinder is reduced and this lets the pressure transmitting means elastically return to its original position. As the pressure transmitting means elastically returns to its original position, the exhaust gas in the booster pump is expelled to the outside through the exhaust line and, at the same time, the booster pump is again charged with the gas mixture remaining in the suction line of the cylinder performing the suction stroke.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

In the following description, the suction and exhaust connection device of the invention will be used with, for example, a typical four-cylinder internal combustion engine. However, please note that the suction and exhaust connection device of the invention may be used with other multi-cylinder internal combustion engine, such as three-, five- or six-cylinder internal combustion engines.

Figure 1:
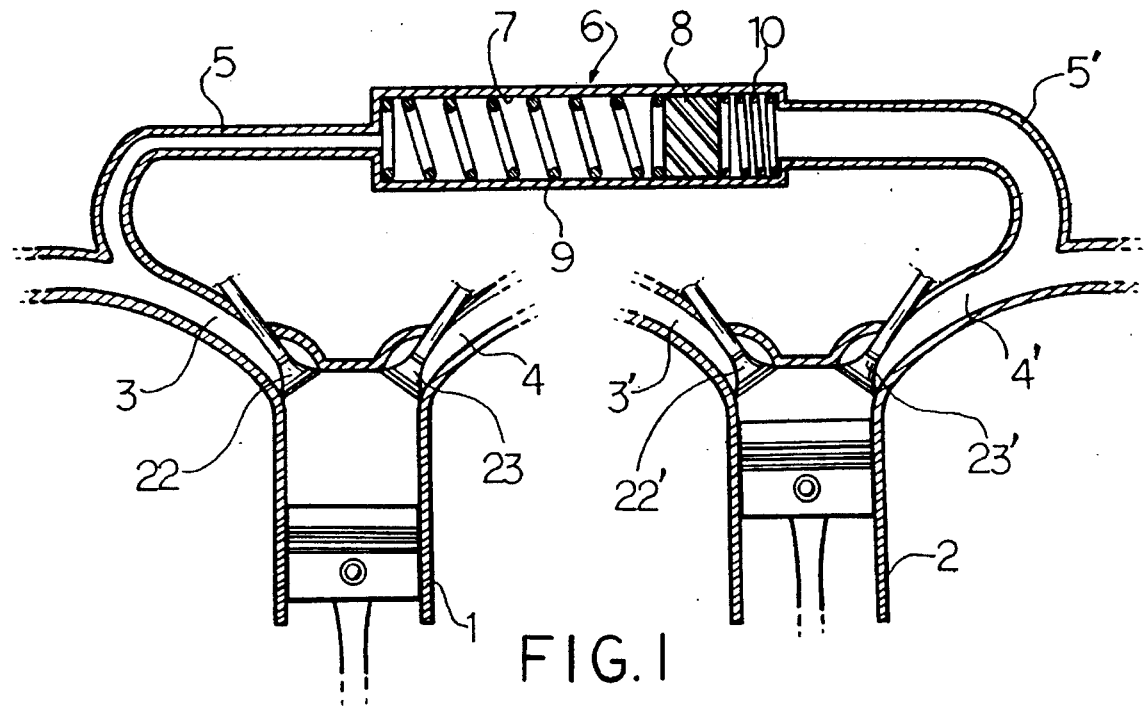
FIG. 1 is a schematic sectional view of a suction and exhaust connection device for an internal combustion engine in accordance with an embodiment of the present invention.

With reference to FIG. 1, there is shown in a schematic sectional view a suction and exhaust connection device in accordance with a first embodiment of the present invention. In the drawing, the reference numeral 1 denotes a first cylinder of a four-cylinder internal combustion engine used with the device of the invention, and the reference numeral 2 denotes a second cylinder, which cylinder 2 is in the exhaust stroke synchronously with a suction stroke of the first cylinder. The head of the first cylinder 1 is provided with a suction port 3 and an exhaust port 4. In the same manner, the head of the second cylinder 2 is provided with a suction port 3' and an exhaust port 4'.

The suction port 3 of the first cylinder 1 is branched to the suction side 5 of a pressure transmitting pipe of the suction and exhaust connection device of the invention. The exhaust port 4' of the second cylinder 2 is branched to an exhaust side 5' of the pressure transmitting pipe. A booster pump 6 is provided between the suction side 5 and the exhaust side 5' of the pressure transmitting pipe. That is, the booster pump 6 is placed at the center of the pressure transmitting pipe. The booster pump 6 comprises a booster cylinder 7 which is connected at its opposite ends to the suction side 5 and exhaust side 5' of the pressure transmitting pipe respectively. Placed in the booster pump cylinder 7 is a reciprocating piston 8, which is biased toward the exhaust side 5' of the pressure transmitting pipe by a return spring 9 having a predetermined restoring force. In the first embodiment, the return spring 9 is a compression coil spring.

In the first embodiment, the spring force of the return spring 9 is set such that the piston 8 of the booster pump 6 is fully biased toward the suction side 5 of the pressure transmitting pipe by the exhaust pressure of the second cylinder 2 in the exhaust stroke and elastically returns to its original position during other strokes, that is, the suction stroke, the compression stroke and the expansion stroke of the second cylinder 2.

In the suction and exhaust connection device of the invention, it is preferred to provide a shock absorbing means for the booster pump 6 in order for preventing the direct collision of the piston 8 against the exhaust side end of the booster cylinder 7 during the reciprocation of the piston 8 in the booster cylinder 7. In the first embodiment, the shock absorbing means comprises a shock absorbing spring 10 placed in the exhaust side of the booster cylinder 7 such that the spring 10 is stopped at its opposed ends by the piston 8 and the exhaust side end of the booster cylinder 7.

In addition, it is preferred to connect the suction side 5 of the pressure transmitting pipe to the suction port 3 of the first cylinder 1 at an acute angle. With the acute angle connection between the suction side 5 of the pressure transmitting pipe and the suction port 3 of the first cylinder 1, it is possible to more easily introduce the suction gas from the suction side 5 of the pressure transmitting pipe into the suction port 3 and in turn into the first cylinder 1. In the same manner, the exhaust side 5' of the pressure transmitting pipe is preferably connected to the exhaust port 4' of the second cylinder 2 at an acute angle. Therefore, it is possible to more easily introduce the exhaust gas from the exhaust port 4' of the second cylinder 2 into the exhaust side 5' of the pressure transmitting pipe.

In order to achieve the object of the suction and exhaust connection device of the invention for improving the engine efficiency of the internal combustion engine, it is required to let the suction side 5 of the pressure transmitting pipe discharge the suction gas therefrom to the suction port 3 of the first cylinder 1 as rapidly as possible and to let the exhaust side 5' of the pressure transmitting pipe be charged with the exhaust gas from the exhaust port 4' of the second cylinder 2 as rapidly as possible. In order to achieve the above object, the suction side 5 of the pressure transmitting pipe has a relatively smaller diameter than the exhaust side 5' of the pressure transmitting pipe.

Figure 4:
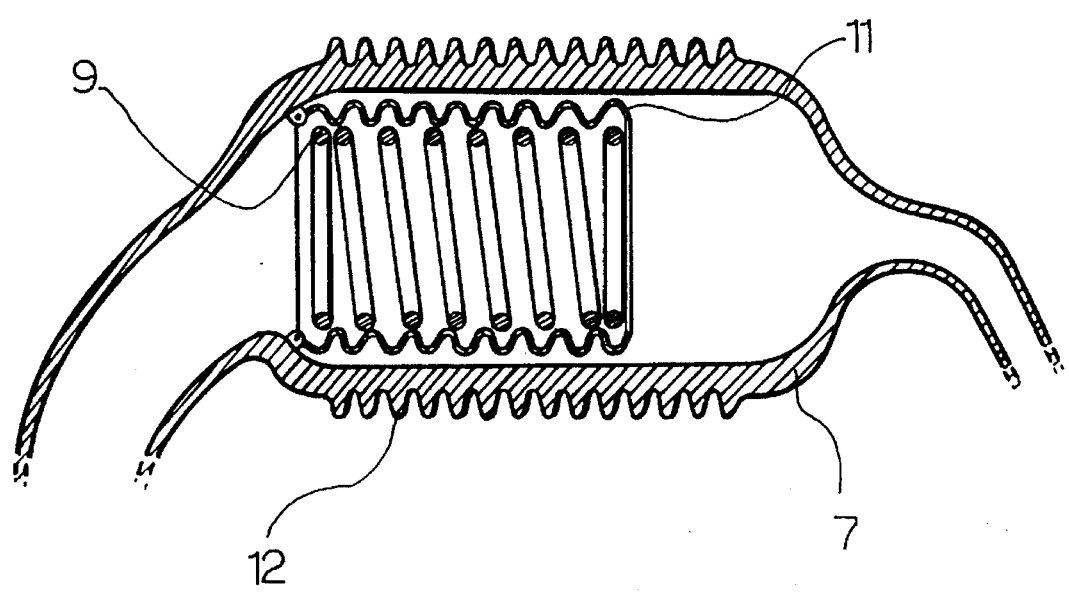
FIG. 4 is a sectional view of a booster pump with the bellows of a suction and exhaust connection device in accordance with another embodiment of the invention.

Turning to FIG. 4, there is shown a booster pump of a suction and exhaust connection device in accordance with a second embodiment of the invention. In the booster pump of the second embodiment, a bellows 11 instead of the piston 8 is placed in the booster cylinder 7. In the second embodiment, the contact area between the suction side and the exhaust side of the booster pump 6 with interposition of the bellows 11 is enlarged. With the enlarged contact area, it is not required to precisely machine the booster cylinder 7 and there is no friction part in the booster pump 6 so that the suction and exhaust connection device of the invention is tree from overheating and abrasion. The device is also increased in its durability. When the restoring force of the bellows 11 is deficient due to insufficient spring force of the bellows 11, the restoring force of the bellows 11 may be reinforced by the return spring 9 in the same manner as described for the piston 8 of the first embodiment.

In FIG. 4, the reference numeral 12 denotes radiation fins formed on the outer surface of the booster cylinder 7 of the booster pump 6.

Hereinbelow, the operational effect of the suction and exhaust connection device of the invention will be described with reference to FIGS. 2A and 2B.

Figure 2A:
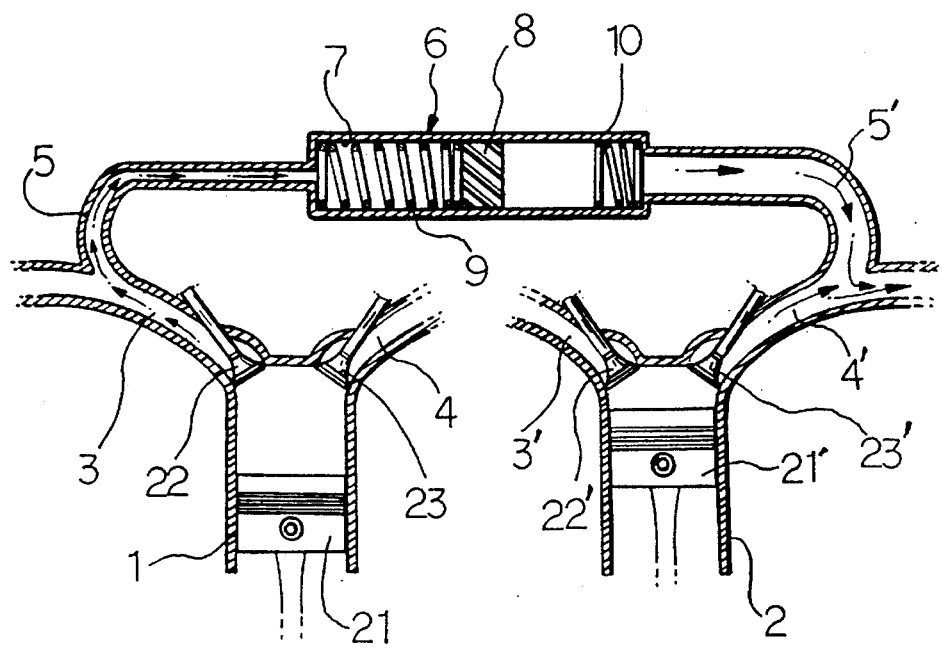
FIGS. 2A and 2B are schematic sectional views of the suction and exhaust connection device of FIG. 1, showing operation cycles of the device respectively.
Figure 2B:
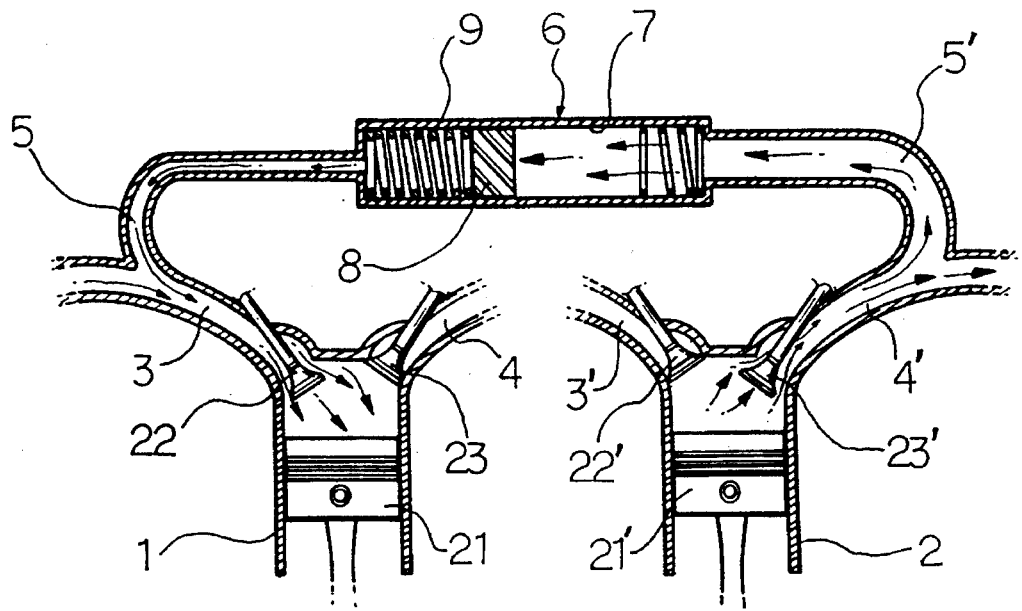

In FIGS. 2A and 2B, the first cylinder 1 and the second cylinder 2 are in the suction stroke and in the exhaust stroke respectively, which strokes are synchronous with each other.

FIG. 2A shows a state in that the piston 8 is returning to the exhaust side of the booster pump 6 after the suction stroke of the cylinder 1 and the exhaust stroke of the cylinder 2. In the state shown in FIG. 2A, the piston 21 of the first cylinder 1 is positioned at the bottom dead center and both the suction valve 22 and the exhaust valve 23 of the first cylinder 1 are closed. Meanwhile, the piston 21' of the second cylinder 2 is positioned at the top dead center and both the suction valve 22' and the exhaust valve 23' of the second cylinder 2 are closed. In this state, both the suction side 5 of the pressure transmitting pipe and the suction side of the booster cylinder 7 are charged with the suction gas, which, being charged in the suction side, fail to be introduced into the first cylinder 1. At this time, the piston 8 of the booster pump 6 is returning to the exhaust side of the booster cylinder 7 by the restoring force of the return spring 9.

The above suction stroke of the first cylinder 1 is followed by three other strokes in order of: the compression stroke, the expansion stroke and the exhaust stroke. The above exhaust stroke of the second cylinder 2 is followed by three other strokes in order of: the suction stroke, the compression stroke and the expansion stroke.

FIG. 2B shows the state of the first and second cylinders 1 and 2 just prior to starting the suction stroke and the exhaust stroke respectively. In FIG. 2B's state, the exhaust valve 23' of the second cylinder 2 is opened and the piston 21' moves upward, and the high temperature, high pressure exhaust gas is expelled from the cylinder 2 through the exhaust port 4' of the cylinder 2. At this time, a part of the exhaust gas expelled from the second cylinder 2 is introduced into the exhaust side 5' of the pressure transmitting pipe so that piston 8 in the booster cylinder 7 is pushed toward the suction side of the cylinder 7 at high speed and the suction gas in the suction side of the booster cylinder 7 is discharged to the suction port 3 of the first cylinder 1. The above-described gas mixture flow of the suction and exhaust connection device of the invention increases both the suction speed and the suction amount for the first cylinder 1.

After the suction stroke of the first cylinder 1 and the exhaust stroke of the second cylinder 2, the suction and exhaust connection device of the first embodiment of the invention returns from the state of FIG. 2B to the state of FIG. 1 through the state of FIG. 2A. That is, when the exhaust valve 23' of the second cylinder 2 is closed and the pressure inside of the exhaust port 4' of the cylinder 2 is reduced, the piston 8 of the booster pump 6 returns to its original position on the exhaust side of the booster cylinder 7 due to the restoring force of the return spring 9. While the piston 8 returns to its original position in the exhaust side of the booster cylinder 7, a part of the suction gas for the first cylinder 1 is charged in the suction side of the booster cylinder 7 and one cycle of the operation of the suction and exhaust connection device of the invention is finished.

In the above description, the construction and the operation of the suction and exhaust connection device of the invention have been described, assuming that the device is used with two cylinders of a four-cylinder internal combustion engine, the suction stroke of the one cylinder is synchronized with the exhaust stroke of the other cylinder. However, it should be understood that the suction and exhaust connection device of the invention may be used with the other cylinders of the four-cylinder internal combustion engine. That is, when the invention is adapted to a four-cylinder internal combustion engine, the engine will be provided with four booster pumps 6. In addition, the suction and exhaust connection device of the invention may be used with a multi-cylinder internal combustion engine whose two cylinders are simultaneously in their suction strokes, synchronized with the exhaust stroke of another cylinder. When using the device of the invention with the above engine, the suction side of the pressure transmitting pipe of the device may be divided into two branch pipes, which will be respectively connected to the suction ports of the two cylinders simultaneously carrying out their suction strokes, synchronized with the exhaust stroke of another cylinder.

The suction and exhaust connection device of the invention used with a series four-cylinder internal combustion engines will be described in more detail with reference to Table 1, which shows the relation between the ignition order and the strokes of the cylinders of the four-cylinder internal combustion engine, in which the cylinders are ignited in the order of cylinder Nos. 1→2→4→3.

TABLE 1

| | crank rotation angle | | | |
|---|---|---|---|---|
| | 1 rotation | | 2 rotation | |
| Cylinder No. | 0°–180° | 180°–360° | 360°–540° | 540°–720° |
| 1 | exp* | exh* | suc* | com* |
| 2 | com | exp | exh | suc |
| 3 | exh | suc | com | exp |
| 4 | suc | com | exp | exh | exp* : expansion stroke
exh* : exhaust stroke
suc* : suction stroke
com* : Compression stroke As shown in Table 1 above, the suction stroke of the first cylinder (cylinder No. 1) is synchronized with the exhaust stroke of the second cylinder (cylinder No. 2) so that the suction port of the first cylinders is connected to the exhaust port of the second cylinders through a first pressure transmitting pipe of the invention. A first booster pump is placed in the center of the first pressure transmitting pipe.

In the same manner, the suction stroke of the second cylinder (cylinder No. 2) is synchronized with the exhaust stroke of the fourth cylinder (cylinder No. 4) so that the suction port of the second cylinder is connected to the exhaust port of fourth cylinder through a second pressure transmitting pipe. A second booster pump is placed at the center of the second pressure transmitting pipe.

Similarly, the suction stroke of the third cylinder (cylinder No. 3) is synchronized with the exhaust stroke of the first cylinder (cylinder No. 1) so that the suction port of the third cylinder is connected to the exhaust port of the first cylinder through a third pressure transmitting pipe. A third booster pump is placed in the center of the third pressure transmitting pipe.

The suction stroke of the fourth cylinder (cylinder No. 4) is synchronized with the exhaust stroke of the third cylinder (cylinder No. 3) so that the suction port of the fourth cylinder is connected to the exhaust port of the third cylinder through a fourth pressure transmitting pipe. A fourth booster pump is placed in the center of the fourth pressure transmitting pipe.

Figure 3:
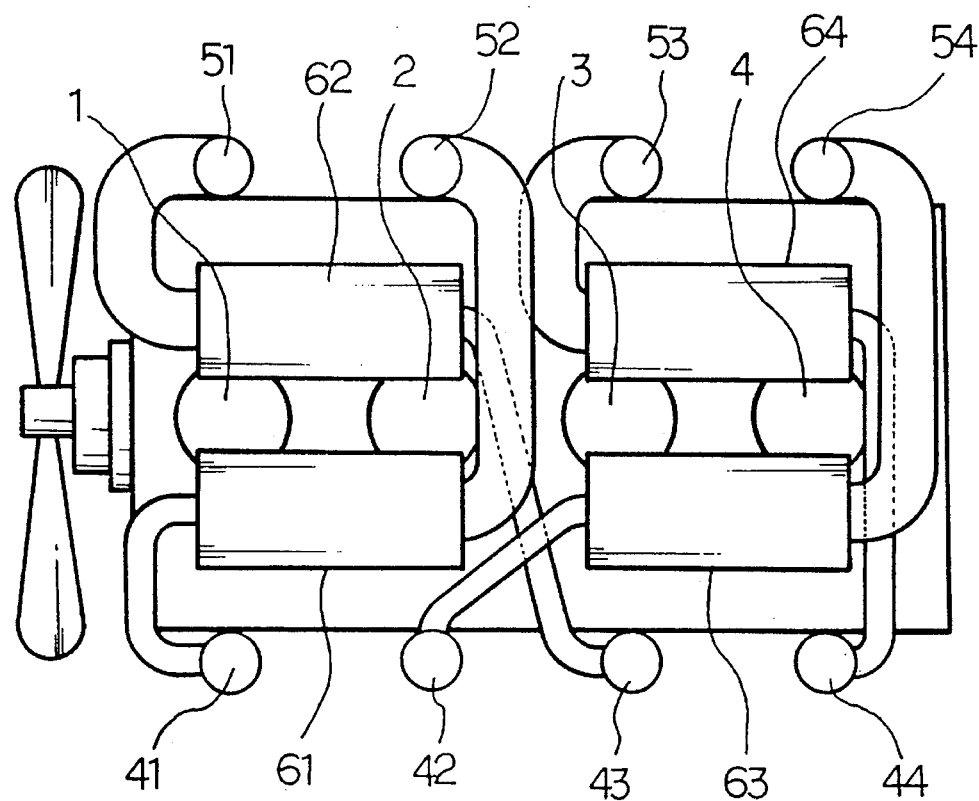
FIG. 3 is a view of the suction and exhaust connection device having four pressure transmitting pipes and four booster pumps of the invention used with a series four-cylinder internal combustion engine.

FIG. 3 is a view of the suction and exhaust connection device having four pressure transmitting pipes and four booster pumps used with the four-cylinder internal combustion engine. As shown in FIG. 3, the four pressure transmitting pipes, that is, the first to fourth pipes, are connected to the suction ports and to the exhaust ports of the first to fourth cylinders as described above.

In FIG. 3, the reference numerals 1, 2, 3 and 4 denote the first to fourth cylinders of the engine respectively, the numerals 41, 42, 43 and 44 denote the suction ports of the first to fourth cylinders respectively. Numerals 51, 52, 53 and 54 denote the exhaust ports of the first to fourth cylinders respectively, and numerals 61, 62, 63 and 64 denote the first to fourth booster pumps of the first to fourth pressure transmitting pipes respectively.

The following Table 2 shows the relation between the ignition order and the strokes of the cylinders of a series six-cylinder internal combustion engine, in which engine the cylinders are ignited in the order of cylinder Nos. 1→5→3→6→2→4. Hereinbelow, the operational effect of the suction and exhaust connection device of the invention used with the six-cylinder internal combustion engine will be described in more detail with reference to Table 2.

TABLE 2

| Cylinder No. | crank rotation angle | | | |
|---|---|---|---|---|
| | 1 rotation | | 2 rotation | |
| | 0°–180° 60°–120° | 180°–360° 240°–300° | 360°–540° 420°–480° | 540°–720° 600°–660° |
| 1 | exp* | exh* | suc* | com* |
| 2 | exh | suc com | com exp | exh |
| 3 | suc | com | exp exh | suc |
| 4 | exp | exh | suc com | exp |
| 5 | com | exp | exh suc | com |
| 6 | suc | com | exp | exh | exp* : expansion stroke
exh* : exhaust stroke
suc* : suction stroke
com* : Compression stroke In the typical internal combustion engines having five or more cylinders, the suction stroke of each cylinder is not precisely synchronized with the exhaust stroke of another cylinder. Therefore, when the suction and exhaust connection device of the invention is used with a six-cylinder internal combustion engine, the exhaust port of a cylinder in the exhaust stroke is connected, by means of a pressure transmitting pipe with a booster pump of the invention, to the suction port of another cylinder in the suction stroke, which is at least partially synchronized with the exhaust stroke of the one cylinder. That is, the second and fourth cylinders (cylinder Nos. 2 and 4) are in their suction strokes partially synchronized with the exhaust stroke of the first cylinder (cylinder No. 1) as shown in the Table 2. In the present invention, it is preferred to select the fourth cylinder (cylinder No. 4) of the two cylinders (cylinder Nos. 2 and 4) so as to be connected to the first cylinder as it is more preferable to let the exhaust stroke of one of the two connected cylinders go ahead of the suction stroke of the other cylinder of the two connected cylinders.

The cylinders of the six-cylinder internal combustion engine will be connected to each other through the pressure transmitting pipes with the booster pumps of the invention in the following manner.

That is, the suction stroke of the fourth cylinder (cylinder No. 4) is partially synchronized with the exhaust stroke of the first cylinder (cylinder No. 1) and the exhaust stroke of the first cylinder moves ahead of the suction stroke of the fourth cylinder. Therefore, the exhaust port of the first cylinder is connected to the suction port of the fourth cylinder through a first pressure transmitting pipe having a first booster pump.

In the same manner, the suction stroke of the sixth cylinder (cylinder No. 6) is partially synchronized with the exhaust stroke of the second cylinder (cylinder No. 2) and the exhaust stroke of the second cylinder goes ahead of the suction stroke of the sixth cylinder. Therefore, the exhaust port of the second cylinder is connected to the suction port of the sixth cylinder through a second pressure transmitting pipe having a second booster pump.

Similarly, the suction stroke of the fifth cylinder (cylinder No. 5) is partially synchronized with the exhaust stroke of the third cylinder (cylinder No. 3) and the exhaust stroke of the third cylinder moves ahead of the suction stroke of the fifth cylinder. Therefore, the port of the third cylinder is connected to the suction port of the fifth cylinder through a third pressure transmitting pipe having a third booster pump.

The suction stroke of the second cylinder (cylinder No. 2) is partially synchronized with the exhaust stroke of the fourth cylinder (cylinder No. 4) and the exhaust stroke of the fourth cylinder moves ahead of the suction stroke of the second cylinder. Therefore, the exhaust port of the fourth cylinder is connected to the suction port of the second cylinder through a fourth pressure transmitting pipe having a fourth booster pump.

The suction stroke of the first cylinder is partially synchronized with the exhaust stroke of the fifth cylinder and the exhaust stroke of the fifth cylinder moves ahead of the suction stroke of the first cylinder. Therefore, the exhaust port of the fifth cylinder is connected to the suction port of the first cylinder through a fifth pressure transmitting pipe having a fifth booster pump.

Similarly, the suction stroke of the third cylinder is partially synchronized with the exhaust stroke of the sixth cylinder and the exhaust stroke of the sixth cylinder moves ahead of the suction stroke of the third cylinder. Therefore, the exhaust port of the sixth cylinder is connected to the suction port of the third cylinder through a sixth pressure transmitting pipe having a sixth booster pump.

As described above, the present invention provides a suction and exhaust connection device for multi-cylinder internal combustion engines. The suction and exhaust connection device of the invention converts the detonation exhaust pressure of a cylinder in the exhaust stroke into suction pressure for another cylinder during a suction stroke synchronized with the exhaust stroke of the one cylinder, thereby increasing both the suction speed and amount. The device also temporarily keeps suction gas therein just after a suction stroke of a cylinder and lets the temporarily kept suction gas be sucked into the cylinder at a high speed during the next suction stroke of the cylinder, thereby restricting the suction interference and increasing the suction amount. The device also temporarily keeps a part of the exhaust gas therein during the exhaust stroke of the cylinder and expels the temporarily kept exhaust gas to the outside after a predetermined time, thereby restricting the exhaust interference and allowing the continuous exhaust of the exhaust gas and reducing the exhaust noise of the engine. The device of the invention further partially transmits the temperature of the exhaust gas to the suction gas so that the device achieves a collateral advantage of suction gas preheating effect.

The suction and exhaust connection device of the invention can be readily used with a typical multi-cylinder internal combustion engine and improves both engine output and fuel consumption without any additional power source. The device also remarkably improves the suction and exhaust efficiency of the internal combustion engine.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A suction and exhaust connection device for an internal combustion engine having a multiple number of cylinders with an ignition order such that, the exhaust stroke of one of the cylinders of said engine is at least partially synchronized with the suction stroke of another cylinder, said device comprising:

a pressure transmitting pipe having opposite ends connected to the exhaust line of one cylinder and to the suction line of an other cylinder respectively and wherein said pipe is connected to the lines of said cylinders according to ignition order of said cylinders such that the exhaust stroke of said one cylinder takes place concurrently with the suction stroke of said other cylinder; and a booster pump in the center of said pressure transmitting pipe, said booster pump increasing the speed of the suction gas in the suction line of said other cylinder during said suction stroke thereof by the exhaust pressure in the exhaust line of said one cylinder during the concurrent exhaust stroke in said one cylinder.

2. The suction and exhaust connection device according to claim 1, wherein said booster pump comprises:

a booster cylinder connected at its opposite ends to a suction side and an exhaust side of said pressure transmitting pipe respectively; and a piston placed in said booster cylinder, and means biassing said piston toward said exhaust side of the pressure transmitting pipe by a predetermined restoring force.

3. The suction and exhaust connection device according to claim 1, wherein said booster pump comprises:

a booster cylinder connected at its opposite sides to the suction side and exhaust side of said pressure transmitting pipe respectively; and a bellows placed in and means biassing said booster cylinder, said bellows toward said exhaust side of the pressure transmitting pipe by a predetermined restoring force.

4. The suction and exhaust connection device according to claim 2, wherein said piston is fully biased toward the suction side of the pressure transmitting pipe by the exhaust pressure of the one cylinder during the exhaust stroke and elastically returns to its original position during the other strokes of the cylinder performing the suction stroke.

5. The suction and exhaust connection device according to claim 3, wherein said bellows is fully biased toward the suction side of the pressure transmitting pipe by the exhaust pressure of the cylinder during the exhaust stroke and elastically returns to its original position during the other strokes of the cylinder performing the suction stroke.

6. The suction and exhaust connection device according to claim 1, comprising a third cylinder having a suction stroke which occurs concurrently with the exhaust stroke of said one cylinder, said pressure transmitting pipe having two divided branch pipes connected respectively, on a suction side of said pressure transmitting pipe, to said other cylinder and to said third cylinder.

7. The suction and exhaust connection device according to claim 2, wherein said means biassing said piston comprises a compression spring in said booster cylinder acting on said piston to urge said piston towards said exhaust side of the pressure transmitting pipe.

8. The suction and exhaust connection device according to claim 7, comprising a shock absorbing spring in said booster cylinder between said piston and the exhaust side of the pressure transmitting pipe.

9. The suction and exhaust connection device according to claim 3, wherein said bellows has an open end connected to said booster cylinder at one side thereof connected to the exhaust side of said pressure transmitting pipe and said bellows extends in said booster cylinder from said open end without contacting the booster cylinder.

10. The suction and exhaust connection device according to claim 9, wherein said open end of the bellows receives exhaust gas under pressure from said one cylinder during the exhaust stroke thereof, said bellows being resilient to provide a restoring force to return the bellows to an initial position when said one cylinder is not in said exhaust stroke.

11. The suction and exhaust connection device according to claim 10, comprising a return spring acting on said bellows to assist return thereof to said initial position.

12. The suction and exhaust connection device according to claim 11, wherein said return spring is disposed within said bellows.

13. The suction and exhaust connection device according to claim 1, wherein end of the pressure transmitting pipe connected to said suction line has a smaller cross-sectional passage than does the end of the pressure transmitting pipe connected to said exhaust line.

14. The suction and exhaust connection device according to claim 13, wherein said ends of the pressure transmitting pipe connected to said suction and exhaust lines are at an acute angle relative thereto.

* * * * *